Nov. 4, 1958    H. A. HOWELL    2,859,299
CHOPPER
Filed Sept. 14, 1953

INVENTOR.
Hugh A. Howell.
BY
Robert L. Kahn
Atty.

United States Patent Office 2,859,299
Patented Nov. 4, 1958

2,859,299
CHOPPER

Hugh A. Howell, Berwyn, Ill., assignor to Oak Mfg. Co., Cook County, Ill., a corporation of Illinois Application September 14, 1953, Serial No. 379,956

1 Claim. (Cl. 200—91)

This invention relates to a chopper and particularly to a chopper for use in circuits where the power to be handled is in the order of milliwatts with the current and potential in the order of milliamps, and millivolts.

In certain types of apparatus, such as communication equipment and instrumentation, it is desirable to provide a chopper for interrupting a circuit or current source at a high rate of speed. Thus as an example, aircraft use 400 cycles for many purposes. Choppers operated at 400 cycles are frequently used. These choppers, as a rule, generate square or rectangular voltage waves whose phase with respect to a driving potential must be maintained within narrow limits. Because of this requirement, it is necessary that the actual operating frequency of a chopper be below the natural resonant frequency of the chopper considered as a mechanical system having inertia and elasticity. In practice, with an operating frequency of 400 cycles per second, it is desirable to have the resonant frequency of the chopper just above 400 cycles and practical considerations usually result in making the resonant frequency about 500 cycles per second.

The operating frequency itself may be subject to some variation. It has been found that as the operating frequency and resonant frequency of the chopper approach each other, there is a large change in phase between the driving voltage and the position of the vibrating element with respect to the contacts. In other words, the contact-closing time will vary widely with respect to a predetermined reference point on the driving potential. The magnitude of the change in phase with change in operating frequency is a function of the Q of the mechanical system. As is well known, the Q of a system, whether it be mechanical or electrical, is the ratio of energy storage to dissipation. Thus a system with a high Q will have a relatively high storage capacity for energy and will have relatively low resistance for dissipating such energy. It has been found that a chopper having a high Q is particularly susceptible to large phase changes with increase in operating frequency toward the resonant frequency of the chopper. For purposes of efficiency, however, high Q choppers are preferred.

By virtue of the invention to be hereinafter described, it is possible to operate a high Q chopper just below its resonant frequency on the steep part of its resonance curve and maintain the phase relationship between the driving potential and chopper response substantially constant in spite of variations in operating frequency. The invention in general contemplates the insertion into the chopper system of mechanical resistance to vibration of the movable member of the chopper only when the vibrating element of the chopper has a tendency to operate at a point above its normal operating point and approach the resonant frequency of the system. By virtue of this invention, such resistance or damping is introduced only when the vibrating part of the chopper tends to move away from its normal operating point in the direction of the resonance peak. It is clear that mechanical resistance under normal operating conditions is undesirable since the Q of the chopper, and consequently the efficiency, are seriously impaired.

For a more complete understanding of the invention, reference will now be made to the drawings wherein examples embodying the invention are illustrated, it being understood, however, that variations may be made without departing from the scope of the invention except as defined by the appended claim.

Referring therefore to the drawings.

Figure 1:
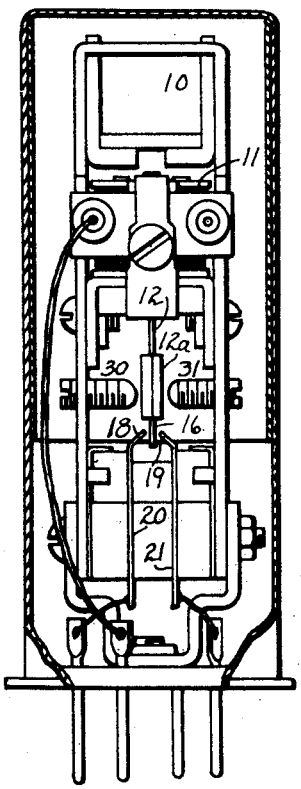
Figure 1 is a diagrammatic view of a chopper embodying the present invention.

The chopper to which this invention may be applied may have any desired construction such as, for example, as disclosed and claimed in my co-pending application Serial No. 280,091, filed April 2, 1952, now Patent No. 2,698,366, issued December 28, 1954. In the drawings, a simple form of chopper is illustrated. Thus the chopper has permanent magnet system 10, the permanent magnet system having suitable magnetic gaps and pole pieces as is well known in the art. Driving winding 11 is adapted to be fed by alternating current from a suitable source of power. This source of power is generally unstable as regards frequency, the power source ranging in frequency somewhat above and somewhat below the desired frequency. Thus in the example given, the power source may be a 400 cycle generator, the frequency of which may vary above and below 400 cycles by several percent.

Armature 12 of suitable construction cooperates with driving winding 11 and permanent magnet system 10. As is well understood, armature 12 is suitably supported so that it may vibrate transversely within the operating winding as the magnetic forces acting upon the armature vary. As is well understood, armature 12 is supported in a suitable manner, the support providing a high degree of elasticity and a minimum of mechanical resistance. Thus armature 12 may be considered as a vibrating part of a high Q vibrating element.

Armature 12 carries movable contact bearing part 16 cooperating with fixed contacts 18 and 19 carried by spring members 20 and 21. Spring members 20 and 21 are light and exert but little force in comparison to the inertia of the vibratory portion of the system during normal operation. Thus contact supporting members 20 and 21 will have just enough spring to yield upon contact action but will have little tendency to vary in any substantial manner the resonance of the vibrating system.

In the form of the invention illustrated in Figure 1, snubbers 30 and 31 are provided, these snubbers cooperating with the vibratory element so as to contact the same in the event that the amplitude of vibration exceeds a predetermined critical value. As illustrated here, armature 12 has enlarged portion 12a for the purpose of controlling the vibration characteristics of the armature. However, enlarged portion 12a may be omitted if desired. The snubbers may assume a variety of forms and are so constructed as to introduce damping or mechanical resistance into the vibratory system at excessive amplitude. Thus for example, snubbers 30 and 31 may be of material as nylon, rubber, leather or the like, or may be of metal having tips of nylon, etc. Such material must have non-linear compliance. The snubbers are suitably supported in the chopper base as in a bolt arrangement. The snubbers are carefully adjusted laterally of armature 12 so that when the chopper is operating at the desired point just below its natural frequency, the vibrating element of the chopper will just clear the snubbers. In the event that the amplitude of vibration tends to increase, then the vibrating element contacts the snubbers at each cycle to introduce mechanical resistance and non-linear compliance. Thus the tendency of the chopper to approach its resonant frequency is resisted.

In the particular example, if the alternating current generator has an operating frequency of 400 cycles, then the resonant frequency of the chopper may be 500 cycles. As is well understood, the resonant frequency of the entire chopper as a whole is a composite of the resonant frequencies of the various elements. Thus the resonant frequency of the armature and reed independently of the stationary contacts may be low, of the order of about 100 cycles per second. The resonant frequency of the stationary contacts by themselves may be of the order of about 2,000 cycles per second. When the vibrating element cooperates with the fixed contacts, the resonant frequency of the system as a whole will be different from the resonant frequencies of the components. The above values are given merely by way of example and are not meant to imply that the two resonant frequencies as given above will necessarily result in a composite resonant frequency of 500 cycles per second. The coupling between the two separate vibrating elements, in this case the stationary contacts and the armature system, must be considered.

Figure 3:
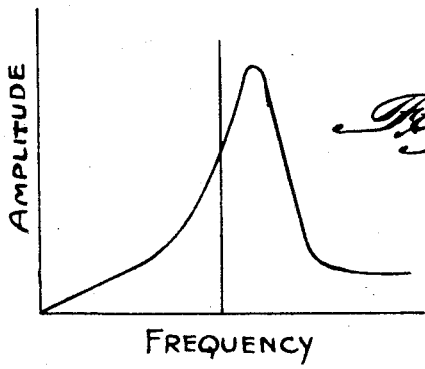
Figure 3 shows a typical resonance curve for a chopper of a type to which this invention is applicable.

As illustrated in Figure 3, a typical resonance curve showing frequency against amplitude may have the resonance peak at some frequency higher than, say, 400 cycles with the operating frequency indicated by the straight vertical line as being at 400 cycles. The normal operating point of the chopper is on the steep part of the resonance curve before the peak is reached so that the operating point of the chopper is on the low frequency steep side of the resonance curve. The higher the Q, the steeper the sides of the resonance curve will be and the sharper the peak. The chopper with which this invention is concerned must of necessity have a high Q since the operating point of the chopper must be on a steep side of the resonance curve. It will be evident from the curve shown in Figure 3 that any tendency for the chopper to operate at a frequency higher than the operating frequency indicated by the solid vertical line will result in a sharp increase in amplitude of the vibrating part of the chopper, in this instance the armature. Consequently, the normal clearance between the vibrating portion of the chopper and the snubbers described in connection with Figure 1 will disappear upon an increase in operating frequency and thus introduce a non-linear resistance into the system.

Figure 2:
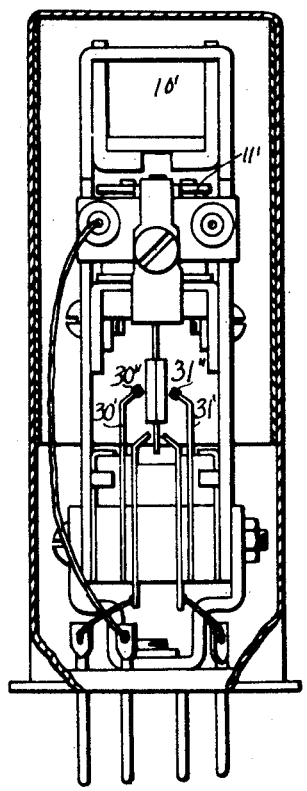
Figure 2 is a diagrammatic view of a modified chopper embodying the present invention.

In Figure 2, a modified form of the invention is illustrated, the chopper there generally having the same construction as in Figure 1. However, instead of snubbers 30 and 31 as illustrated in Figure 1, substantially rigid arms 30' and 31' are carried by the chopper, such as, for example, the stack at the lower end of the chopper frame. Rigid arms 30' and 31' are preferably of metal having a certain amount of resilience and these arms carry at their tips snubbers 30" and 31" of suitable material, such as nylon, leather, rubber or any other compressible material having a non-linear compression characteristic. If desired, suitable screw means may be carried by the frame at opposite sides thereof similar to snubbers 30 and 31 in Figure 1, such screw means, however, engaging rigid arms 30' and 31' to adjust the normal rest position of the snubber tips. By having arms 30' and 31' of sufficiently rigid material, thus making the natural frequency of each of these arms by itself very high, of the order of several thousand cycles per second, it will be clear that any tendency for armature 12' to have excessive amplitude will be resisted in a manner generally resembling the action of the construction illustrated in Figure 1.

It is possible to omit snubbing tips 30" and 31" and depend upon the mechanical contact of the hard tips of arms 30' and 31'. In such event, the coupling between arms 30' and 31' on the one hand and armature 12' on the other hand will be rendered very close only when the armature has excessive amplitude. By virtue of this close coupling, the resonant frequency of the entire system will be temporarily moved to a much higher value. Thus, even though no snubbing tips 30" and 31" are provided, the damping action of arms 30' and 31' will be effective to reduce the amplitude of the armature.

The chopper is illustrated as being disposed in a conventional housing. The housing interior may have a layer of sound absorbing material.

What is claimed is:

A chopper comprising a frame having a permanent magnet system, a driving winding, a reed armature supported at one end and having the other end free to vibrate, said armature having an enlarged portion for the purpose of controlling the vibration characteristics of the armature, light spring contacts carried by said frame and disposed on opposite sides of said reed armature for alternate make and break during reed vibration, said spring contacts having negligible effect on the reed, and said chopper including a stack in proximity to the free end of the armature, stiff metal arms carried by said stack and extending toward said armature, there being one arm on each side of the armature, each arm carrying a snubber of non-linear compressible material such as nylon, said snubbers being disposed on opposite sides of said enlarged armature portion and being spaced therefrom so that said snubbers will engage said enlarged armature portion on excessive armature amplitude whereby said chopper may operate with its winding supplied with alternating currents at a frequency below the resonant frequency of the armature, said armature system having a high Q and the chopper operating in a stable manner upon the steep side of the resonance curve.

References Cited in the file of this patent
UNITED STATES PATENTS

| | | |
|---|---|---|
| 1,328,825 | Drysdale | Jan. 27, 1920 |
| 1,607,910 | O'Neill | Nov. 23, 1926 |
| 1,656,250 | Thompson et al | Jan. 17, 1928 |
| 1,676,979 | Cheeseman | July 10, 1928 |
| 1,838,573 | Rosenkilde et al. | Dec. 29, 1931 |
| 2,303,952 | Pfleger | Dec. 1, 1942 |
| 2,440,145 | Huetten | Apr. 20, 1948 |
| 2,473,353 | Aust | June 14, 1949 |
| 2,547,026 | Winkler | Apr. 3, 1951 |
| 2,571,780 | Stoller | Oct. 16, 1951 |
| 2,675,441 | Side | Apr. 13, 1954 |
| 2,677,027 | Woods | Apr. 27, 1954 |